United States Patent
Armstrong

[11] 3,899,822
[45] Aug. 19, 1975

[54] METHOD OF ATTACHMENT OF A PROSTHESIS TO A MEMBRANE

[75] Inventor: Beverly W. Armstrong, Charlotte, N.C.

[73] Assignee: Richards Manufacturing Company, Inc., Memphis, Tenn.

[22] Filed: Mar. 20, 1974

[21] Appl. No.: 452,827

Related U.S. Application Data

[62] Division of Ser. No. 323,940, Jan. 15, 1973, Pat. No. 3,838,468.

[52] U.S. Cl. ................................. 29/450; 29/235
[51] Int. Cl.² ........................................ B23P 11/02
[58] Field of Search ............. 29/450, 451, 453, 235; 3/1

[56] References Cited
UNITED STATES PATENTS

| | | | |
|---|---|---|---|
| 2,795,036 | 6/1957 | Haushalter | 29/450 |
| 2,924,008 | 2/1960 | Haushalter | 29/450 UX |
| 3,018,824 | 1/1962 | Anderson et al. | 29/453 UX |
| 3,541,660 | 11/1970 | Soto | 29/453 X |

*Primary Examiner*—Charlie T. Moon
*Attorney, Agent, or Firm*—John R. Walker, III

[57] ABSTRACT

A prosthesis for use in otological surgery to replace the stapes of the middle ear. The prosthesis is slit transversely to establish a pair of legs constituting the distal end thereof. The legs are resilient and may be spread apart to urge a bight portion of a membrane, e.g., a vein section, therebetween which is then gripped by the prosthesis. Accordingly, the likelihood of the prosthesis becoming detached from the membrane is substantially nil. The proximal end of the prosthesis is adapted to be attached to the incus and preferably includes a wire having the shape of a shepherd's crook for encircling the incus and which may be crimped thereto.

A jig is herein disclosed to accomplish the task of urging the bight portion of the membrane between the legs of the prosthesis. The jig includes a main body suitably attached to a stand and an upwardly directed ridge attached to the main body for insertion between the pair of legs of the prosthesis.

A method of attaching the prosthesis and the membrane one to the other is also disclosed herein and includes the steps of: First, providing the above-mentioned jig. Second, providing the distal end of the prosthesis with a pair of legs for gripping the membrane. Third, placing the membrane over the ridge of the jig with the ridge restingly supporting a portion of the membrane intermediate remote edges thereof. Fourth, placing the distal end of the prosthesis upon the jig with the transverse slit being aligned with the ridge and with the membrane being sandwiched therebetween. Fifth, thrusting the prosthesis downwardly so that the legs straddle the ridge and a bight portion of the membrane is urged between the legs. Sixth, withdrawing the prosthesis from the jig with the bight portion of the membrane being grippingly attached to the prosthesis.

1 Claim, 10 Drawing Figures

PATENTED AUG 19 1975 3,899,822

METHOD OF ATTACHMENT OF A PROSTHESIS TO A MEMBRANE

This is a division of application Ser. No. 323,940, filed Jan. 15, 1973, now U.S. Pat. No. 3,838,468.

BACKGROUND OF THE INVENTION

1. Field of the Invention

This invention relates to the field of otology implants.

2. Description of the Prior Art

The Mercandino et al., U.S. Pat. No. 3,191,188 describes a method of treating otosclerotic deafness by substituting an artificial stapes for the human stapes. The artificial stapes consists of a thin laminar base adaptable to the niche of the oval window from which lamina rises a tubular strut or stem that articulates with the incus, i.e., the strut being attached to the lenticular process of the incus thus replacing the mechanical link between the incus and the oval window.

The Robinson U.S. Pat. No. 3,196,462 describes another prosthesis which comprises an enlarged proximal portion that is hollow and open at the outer end for attachment to the incus. A reduced shank portion extends axially and centrally from the proximal portion. A vein graft is positioned over the oval window and is maintained in position thereover by the pressure exerted by the distal end of the prosthesis. In other words, the prosthesis is not attached to the vein graft. However, a slightly modified technique is disclosed where instead of a vein graft being used, a fat graft is employed for blocking the oval window. In this latter embodiment a wire is looped through a transverse opening provided adjacent the distal end and around the fat graft to maintain it in proper position.

The Haase et al., U.S. Pat. No. 3,473,170 describes a prosthesis for insertion into the middle ear cavity to replace the ossicles. In other words, the foot plate of the stapes remains in the oval window. Accordingly, this prosthesis is attached to the foot plate of the stapes.

The Shea prosthesis, which is disclosed in an application, Ser. No. 67,405, filed Aug. 27, 1970 and assigned to the assignee of the present application, is a prosthesis for the middle ear to replace the stapes and is attached to the under surface of the lenticular process of the incus. In other words, the distal end of the prosthesis simply touches the vein graft which closes the oval window and a gelfoam is placed adjacent the distal end to hold it to the vein graft during the healing process. It should be noted that none of the above patents or patent application show or suggest applicant's device.

It should be pointed out that a particular disadvantage prevails with the above-mentioned disclosures. This disadvantage was identified in the '462 patent and the following is a quote from column 1, lines 45–49 thereof:

> Should the polyethylene strut become detached from the incus, there would be no way of determining this dislocation without surgical re-exploration of the middle ear since polyethylene is not radiopaque.

The applicant is not aware of any prior device which grips the vein graft or is attached thereto in any other manner except by the use of the gelfoam. Accordingly, any of the prior prostheses known by the applicant are subject to becoming dislocated with respect to the vein graft.

SUMMARY OF THE INVENTION

The present invention is directed towards overcoming the heretofore mentioned and other disadvantages in prostheses for replacing the stapes.

The concept of the present invention is to provide a prosthesis which will have substantially the same resonant frequency as the natural stapes and which efficiently and firmly attaches to the incus and to the vein graft. The prosthesis of the present invention includes a piston part which has the distal end thereof slit transversely to establish a pair of legs. The legs, being resilient, may be spread apart to urge a bight portion of a membrane therebetween, e.g., a vein graft previously removed from the patient usually from the back of his hand. Therefore, the membrane is gripped by the prosthesis. Accordingly, the likelihood of the prosthesis becoming detached from the membrane is substantially nil. The proximal end of the prosthesis is adapted to be attached to the incus in any well-known manner. However, I prefer that the proximal end includes a wire which is attached to the teflon piston or distal end. The wire is shaped somewhat like a shepherd's crook for encircling the incus and which may be crimped thereto.

A jig is herein disclosed to accomplish the task of urging the bight portion of the membrane between the legs of the prosthesis. The jig includes a main body suitably attached to a stand and an upwardly directed ridge attached to the main body for insertion between the pair of legs of the prosthesis.

A method of attaching the prosthesis and the membrane one to the other is also disclosed herein and includes the steps of: First, providing the abovementioned jig. Second, providing the distal end of the prosthesis with a pair of legs for gripping the membrane. Third, placing the membrane over the ridge of the jig with the ridge restingly supporting a portion of the membrane intermediate remote edges thereof. Fourth, placing the distal end of the prosthesis upon the jig with the transverse slit being aligned with the ridge and with the membrane being sandwiched therebetween. Fifth, thrusting the prosthesis downwardly so that the legs straddle the ridge and a bight portion of the membrane is urged between the legs, i.e., the exterior distal end of the prosthesis engaging the main body of the jig. Sixth, withdrawing the prosthesis from the jig with the bight portion of the membrane being grippingly attached to the prosthesis. The surgeon is now ready to engage the proximal end of the prosthesis with the incus in the usual manner, after which he places the membrane over the oval window thus completing the mechanical link between the incus and the oval window.

DESCRIPTION OF THE PREFERRED EMBODIMENT

Figure 9:
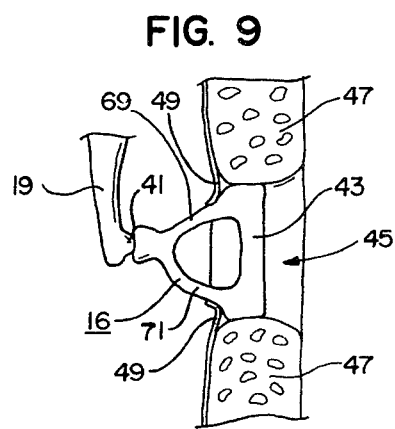
FIG. 9 is a cross-section of the oval window of the middle ear, showing the stapes completing the link between the incus and the oval window.

The prosthesis 11 of the present invention comprises in general an elongated piston member 13, a wire-like proximal end member 15 including a shepherd's crook portion 17 with the member 15 being fixedly attached to the piston member or distal end 13, as by means of an embedded hook 18. Piston member 13 is preferably formed from a suitable material that is somewhat flexible and has substantially the same natural resonant frequency as the replaced stapes which is shown in FIG. 9 and character referenced therein by the numeral 16.

A suitable material having the desirable characteristics for the piston member 13 is "Teflon", which is a tetrafluoroethylenehexafluoropropylene copolymer and is a registered trademark of the DuPont Company.

The wire-like member 15 preferably is formed from stainless steel, however, other inert metallic materials, such as platinum, gold and the like could be used.

It should be pointed out that the proximal end 15 may be varied in structure to conform to other well-known otologic implants without departing from the spirit and scope of the present invention, e.g., like the previously mentioned Shea prosthesis.

Figure 1:
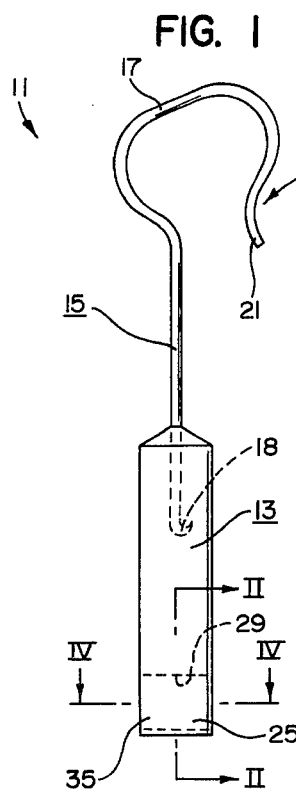
FIG. 1 is a side elevational view of the prosthesis of the present invention.
Figure 10:
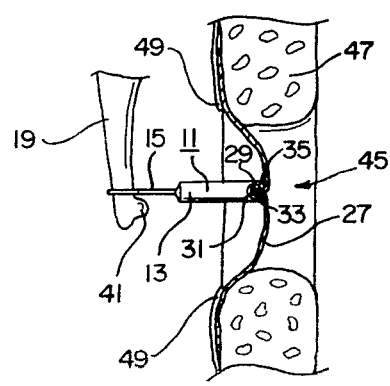
FIG. 10 is a view similar to FIG. 9 with the stapes being removed and showing the prosthesis of the present invention completing the mechanical linkage between the incus and the oval window.

From FIG. 1 of the drawing it may be seen that the proximal member 15 as herein disclosed includes enough wire to completely encircle the long process of the incus 19 as shown in FIGS. 9 and 10 of the drawing. Additionally, an angled extension 21 serves as a guide to facilitate introduction over the incus 19 and provides a notch 23 to accommodate the tip of a crimper (not shown), minimizing the danger of trauma to the mucosa.

Figure 2:
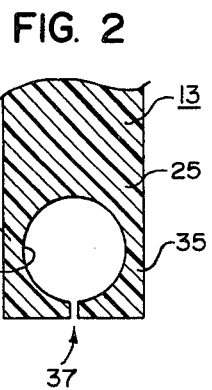
FIG. 2 is a sectional view taken as on the Line II—II of FIG. 1 showing a transverse slit in the prosthesis extending from the distal exterior thereof to the aperture therein to establish the pair of legs which grip the membrane.

An important concept of the present invention is that the distal end, as shown at 25, of the prosthesis 11 is fixedly attached to membrane structure, characterized herein by the numeral 27 in FIGS. 6 through 8 and FIG. 10. More specifically, the piston member 13 is preferably solid and cylindrically shaped with the distal end 25 thereof being provided with a transverse aperture 29 for loosely receiving a bight portion 31 of the membrane structure 27. Additionally, the distal end 25 is interrupted along a line extending parallel with the bore of the aperture 29 to establish a pair of legs 33, 35 with an interruption 37 therebetween as best viewed in FIGS. 2 and 4 of the drawing.

Further, the distal end 25 preferably is provided with a pair of notches 39 leading in to the respective ends of the interruption 37 for receiving and guidingly constraining certain structure yet to be disclosed. The legs 33, 35 have a resilient characteristic and are adapted to be spread in a manner yet to be disclosed while the bight portion 31 of the membrane 27 is urged therebetween and to grippingly engage and retain a double thickness of the membrane structure 27 after the withdrawal of the structure alluded to above.

Particular attention is now directed toward FIG. 9 of the drawing wherein it may be seen that the stapes 16 normally is connected to the incus 19 by the lenticular process character referenced by the numeral 41. The stapes 16 includes a foot plate portion which is slightly invaginated in an oval window 45 defined by utricle structure character referenced herein by the numeral 47. It should be noted that the stapes 16 is supported in the oval window 45 by lining membrane 49.

From FIG. 10 of the drawing it may be seen that the stapes 16 (shown in FIG. 9), including the foot plate 43, has been removed from the middle ear and replaced by the prosthesis 11 of the present invention. More specifically, the lining membrane 49, having been previously elevated from the circumference of the oval window 45, i.e., when the stapes 16 was removed, is replaced over the edge of the vein graft or membrane structure 27 to hold it in place. It should be understood that the membrane structure 27 may optionally consist of an inert synthetic material such as Teflon sheeting or the like or it may be a vein graft previously removed from the patient. The latter usually is removed from the back of the hand and is slightly larger than the oval window 45, e.g., approximately 1 millimeter larger at each margin edge. The vein graft is usually positioned with the intima side thereof contiguously engaging the utricle structure 47 and with the adventitia up or the distal end 25 of the prosthesis 11 being engaged therewith. Accordingly, it may be appreciated that particular care has been directed toward attaching the vein graft or membrane 27 to the structure 47 defining the oval window 45. Additionally, even more attention has been directed toward discovering an optimum technique for attaching the proximal end of the prosthesis to the incus, e.g., the aforementioned Shea prosthesis.

However, it should be pointed out that heretofore the usual technique for attaching the distal end of the prosthesis to the vein graft was with the use of gelfoam as clearly disclosed in said Shea prosthesis. In other words, the state of the art has developed the mechanical link of the prosthesis so that it is positive in its attachment of the proximal end to the incus 19 and in some instances to the lenticular process 41, but has not been as positive in attaching the distal end to the vein graft or membrane 27.

Figure 3:
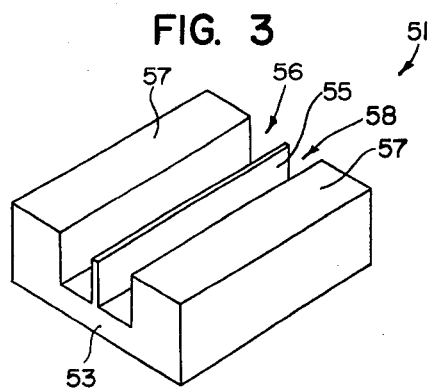
FIG. 3 is a perspective view of the jig fixture of the present invention showing the upwardly directed ridge for insertion between the legs of the prosthesis.

A jig fixture 51 is herein disclosed for facilitating the attachment of the vein graft or membrane structure 27 to the distal end of the otological prosthesis 11 of the present invention. It should be understood that the prosthesis used herewith has been provided with the pair of legs 33, 35 for straddling and gripping a portion of the vein graft or membrane 27. The jig fixture 51 includes a main body 53 and an upwardly directed ridge 55 fixedly attached to the main body 53 for insertion between the pair of legs 33, 35 to urge the bight portion 31 of the vein graft or membrane 27 between the legs 33, 35 for the retention thereof after withdrawal of the ridge 55. The jig 51 preferably includes a pair or remotely disposed ledges 57 which are attached to the main body 53 for restingly supporting remote margin portions of the vein graft or membrane structure 27, i.e., the margin portions shown by the numerals 27' and 27″ (FIG. 6), prior to attachment of the membrane 27 to the prosthesis 11. From FIG. 3 of the drawing it may readily be seen that the ledges 57 extend parallel with the ridge 55 and are disposed at predetermined spaced apart distances therefrom, thus defining a pair of channels 56, 58 for receiving the respective legs 33, 35 in a manner yet to be fully disclosed.

Figure 4:
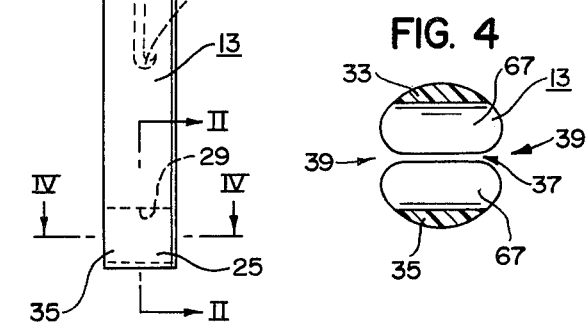
FIG. 4 is a sectional view taken as on the Line IV—IV of FIG. 1.
Figure 5:
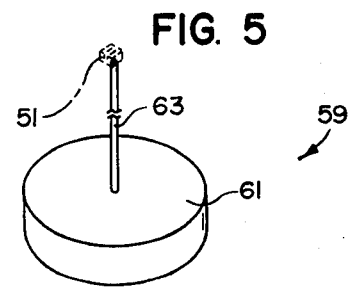
FIG. 5 is a perspective view of a stand for supporting the jig fixture which is intended to be attached to the upper end of a post thereof as depicted in phantom therein.

It should be pointed out that the structure depicted in FIGS. 1 through 10 of the drawing is several times the actual size. In this regard, the interruption 37 appears exaggerated in width. In other words, the actual piston member 13 may suitably be provided with the aperture 29 and the interruption may be formed with a very thin knife (not shown) or razor blade, i.e., preferably removing none of the Teflon in the severing process. More specifically, typical diameters for the piston member 13 are 0.6 millimeters and 0.8 millimeters. Further, typical lengths for the prosthesis 11 not including the shepherd's crook 17 are: 3.5 millimeters; 3.75 millimeters; 4.0 millimeters ranging on up to 5.75 millimeters or the like. Accordingly, the jig fixture 51 is compatibly sized with the prosthesis 11 and in itself would be very small and have little mass. Therefore, stand means 59, as shown in FIG. 5, is herein disclosed for supporting the jig fixture 51 in a fixed position to facilitate the utilization thereof, the jig fixture 51 being phantomized in a preferred position therein. More specifically, the stand means 59 includes a substantially heavy base portion 61 having a stanchion 63 for suitably receiving and supporting the jig fixture 51. From FIGS. 6 through 8 of the drawing it may be seen that the jig fixture 51 is provided with a bore 65 for receiving the stanchion 63.

Several advantages are gained by attaching the distal end 25 to the vein graft or membrane structure 27: First, the piston member 13 and the vein graft or membrane structure 27 are held together during the healing or growth period during which time the vein graft attaches itself permanently to the piston 13. Second, the distal end 25 of the piston 13 is positioned substantially in the center of the oval window 45 with assurance that it will remain intact. Heretofore when the gelfoam was packed in the oval window or when the gelfoam was packed on the vein graft it was difficult if not impossible to determine exactly whether the piston was centrally positioned or for that matter whether it actually is in contact with the vein graft. Third, the piston member 13 is supported in an upright manner, i.e., supported in an axis perpendicular to the general plane of the vein graft or membrane 27, thus making the task of placing the prosthesis in the proper position easier. This is because the vein graft or membrane 27 is aligned with the periphery of the jig 51. The piston member 13 is placed in the center of the jig 51 when made to engage the graft in a manner yet to be described.

From FIG. 4 of the drawing it may be seen that the extreme distal end of the piston member 13 defines oval-like foot portions 67. The foot portions 67 preferably do not have sharp corners so as to avoid rupturing the vein graft or membrane 27. It should also be pointed out that the prosthesis 11 of the present invention performs more closely to the stapes 16 than prior known devices. More specifically, from FIG. 9 of the drawing it may be seen that the stapes 16 includes a pair of legs 69, 71 which transmit the vibrations from the incus 19 to the foot plate 43. Thus, the legs 33, 35 correspond to the legs 69, 71 and vibrate in a manner similar thereto and aid in transmitting the sound waves to the inner ear.

Figure 6:
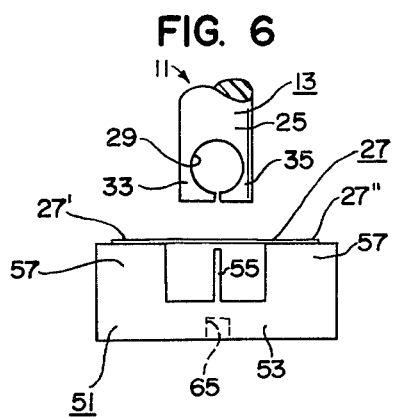
FIGS. 6 through 8 depict the distal end of the prosthesis, the jig fixture, and membrane structure to sequentially illustrate the method of attaching the prosthesis and the membrane one to the other.
Figure 7:
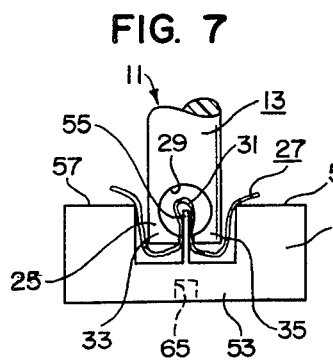
Figure 8:
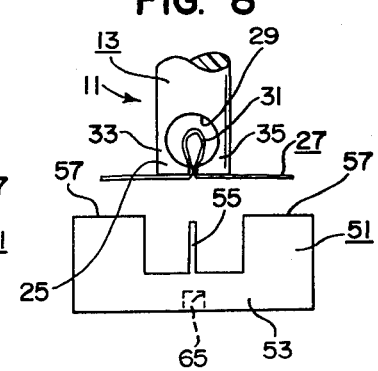

A method of attaching the prosthesis 11 and the vein graft or membrane 27 one to the other is also disclosed herein as sequentially depicted in FIGS. 6 through 8 of the drawing. More specifically, the method herein disclosed includes the steps of: First, providing the above-disclosed jig fixture 51. Second, providing the distal end 25 of the prosthesis 11 with the above-described legs 33, 35 for gripping the vein graft or membrane 27. Third, placing the vein graft or membrane 27 over the ridge 55 of the fixture 51 (FIG. 6) with the ridge 55 restingly supporting a portion of the vein graft or membrane 27 intermediate remote edges or margins 27′27″ thereof. Care should be taken to place the adventitia thereof upward so that the vein graft will be properly oriented when placed over the oval window. Fourth, placing the distal end 25 of the prosthesis 11 upon the jig fixture 51 with the interruption 37 being aligned with the ridge 55 and with the vein graft or membrane structure 27 being sandwiched therebetween as indicated in FIG. 6 of the drawing. Fifth, thrusting the prosthesis 11 downwardly, while bein supported in a substantially upright position, to drive the ridge 55 and the bight portion 31 of the vein graft or membrane structure 27 between the legs 33, 35 of the prosthesis 11, as clearly shown in FIG. 7 of the drawing. In this connection, it will be understood that the notches 39 aid in performing this step since the ridge 55 is guided into position between the legs 33, 35 by the notches 39. Sixth, withdrawing the prosthesis 11 from the jig 51 with the bight portion 31 of the vein graft or membrane structure 27 being grippingly attached to the prosthesis 11 as indicated in FIG. 8 of the drawing.

Although the invention has been described and illustrated with respect to a preferred embodiment thereof, it is to be understood that it is not to be so limited since changes and modifications may be made therein which are within the full intended scope of the invention.

I claim:

1. A method of attaching the distal end of a prosthesis to membrane structure for use in otological surgery to replace the stapes of the middle ear comprising the steps of providing a jig fixture having an upwardly directed ridge, providing the distal end of the prosthesis with a pair of leg means for gripping the membrane structure, placing the membrane structure over said ridge of said fixture with said ridge restingly supporting a portion of the membrane structure intermediate remote edges thereof, placing the distal end of said prosthesis upon said jig fixture with the membrane structure being sandwiched therebetween, thrusting said prosthesis downwardly while being supported in a substantially upright position to drive said ridge and a bight portion of the membrane structure between said pair of legs of said prosthesis, and withdrawing said prosthesis from said jig fixture with the bight portion of the membrane structure being grippingly attached to said prosthesis.

* * * * *